3,097,175
STABLE SILICA-CLAD THORIA SOLS AND THEIR PREPARATION
Wayne T. Barrett, Arnold, Moisés G. Sañchez, Glen Burnie, and Milton C. Vanik, Baltimore, Md., assignors to W. R. Grace & Co., New York, N.Y., a corporation of Connecticut
No Drawing. Filed Oct. 31, 1957, Ser. No. 693,511
14 Claims. (Cl. 252—313)

This invention relates to stable thoria sols and to methods of preparing them. In one specific aspect, it relates to a clad thoria sol suitable for a breeder "blanket" in nuclear power reactors.

In nuclear reactors of the breeder type, it is the general practice to have a source of neutrons, often a core containing a uranyl sulfate solution. Under proper neutron flux conditions, the uranium will fission with evolution of additional neutrons. Surrounding this core is a "blanket" or layer containing thorium. Neutrons leaving the core are captured in part by the thorium, thereby converting the thorium 232 to thorium 233. Thorium 233 decays with a half life of 23.3 minutes to yield protactinium 233 which in turn decays to uranium 233, both decay reactions releasing some energy. Thus thorium is made to produce energy and, at the same time, is converted to another very important nuclear element.

The breeder "blanket" operates at a temperature about 250–300° C. with a flux of about $10^{13}$ neutrons/cm.$^2$ sec. From the point of view of neutron efficiency it is necessary to have a system free of elements with high neutron-capture cross-sections to insure that the thorium captures a maximum quantity of neutrons. It is also important to have present a moderator comprising an element or elements which can undergo elastic collisions with neutrons while not absorbing neutrons. In this manner, fast neutrons from the core are slowed down to thermal neutrons as they transfer their energy to the system. A suitable reactor combination will include: (1) a source of fast neutrons, i.e. core of reactor; (2) thorium dioxide as a breeder fuel; (3) heavy water as a moderator. Heavy water is an excellent moderator because both oxygen and deuterium exhibit very low neutron capture cross-sections which allows them to undergo elastic collisions with neutrons without absorption. In addition, heavy water is an excellent transfer material which may be cycled in and out of the reactor for heat exchange purposes. The fast neutrons emitted by the core are slowed down by the heavy water moderator and are then absorbed by the thorium, all of which starts a series of reactions whereby large amounts of energy are liberated and the "blanket" heated thereby.

Thoria-deuterium oxide in slurry form have been tried for use as a reactor "blanket." However, this use has been characterized by several difficulties. In the first place, slurries must be continuously agitated to prevent separation of the solids from the liquid. This difficulty alone is practically insurmountable since it is not possible to maintain agitation throughout the system. The slurries are somewhat thixotropic and under quiescent conditions become quite viscous. Because the thoria particles in a slurry using this system readily attrite, on settling, they tend to form very hard cakes. In addition, thoria particles of the size normally useable in slurry form erodes the system badly. Also, thoria slurries have poor heat-transfer characteristics. These difficulties have hindered the use of thoria slurries for breeder "blankets."

It is easily conceivable that a homogeneous dispersion of thoria particles of colloidal size would not involve the foregoing disadvantages. A stable sol would not be subject to settling, which, alone, would eliminate one of the most serious drawbacks heretofore encountered. In addition, the erosion problem would be substantially eliminated and, because of the relatively low viscosities of sols, pumping would be greatly facilitated.

Unfortunately no one has heretofore been able to produce a thoria sol which is stable at the operating temperatures of this type of system. Thoria sols of the prior art have been universally characterized by a tendency to gel or precipitate on heating. The organic dispersing agents normally considered for making sols cannot be used in reactors because they tend to degrade under the strong radiation flux. Other additives must be selected with extreme caution. Elements of high neutron capture cross-section must be avoided because they reduce the efficiency of the system. Electrolytes should be avoided because they tend to precipitate the thoria and because they are highly corrosive, especially at high temperatures. Halides are particularly undesirable.

In accordance with the present invention, it is now possible to prepare a thoria sol of suitable high thoria content, free from undesirable neutron-capturing components, which is stable at the temperatures employed in nuclear reactors of the type described. The particles or micelles of the thoria sols prepared in accordance with the present invention are of such small size that there is no tendency to settle. In addition, the particles are substantially spherical in shape so that there is very little attrition of particles, abrasion of equipment is minimized and pumping is facilitated by the low viscosities of the sols.

Another advantage in use results from the small micelle size. It is known that recoils of up to a few microns take place in solids. In use, it is quite possible that the by-products of the nuclear reaction would be ejected out of the micelles into the water where they could be removed without the necessity of processing the entire system.

In accordance with the present invention we have discovered that thoria particles of desirable (hereafter defined) micelle size can be coated or clad with a layer of reactive silica and the entire sol stabilized by the addition of an alkali metal hydroxide. The silica and alkali metal have desirably low-neutron-capture cross-section and do not interfere with the reaction involving the thoria. However, in order to obtain the desired characteristics, it is necessary that the various components be prepared in a carefully controlled manner and brought together in a specified order under likewise carefully controlled conditions.

THORIA SOL PREPARATION

In order to obtain a final thoria sol of the necessary hydrothermal stability, low viscosity and susceptibility to cladding, it is necessary that the initial thoria particles be spheroidal or substantially so. In addition, the particles suitable for use in production of the stabilized sols of the present invention should preferably be of generally uniform size of more than about 50 millimicrons weight median diameter but still exhibiting colloidal properties.

Suitable parent thoria sols can be prepared by gradually removing anions from a dilute thorium salt solution while maintaining the system at an elevated temperature. Preferred techniques suitable for anion removal are: (1) electrodialysis using anion permeable membrane, (2) dialysis using an anion permeable membrane, (3) ion exchange using resin in hydroxide form, (4) decomposition of the salt of a volatile acid, (5) electrolysis of a thorium salt, the anion of which is oxidized to a volatile compound or state.

In the present process, we may start with an aqueous solution of any thorium salt of a strong mono-basic acid, preferably with a salt which is sufficiently soluble that a 5–10% equivalent $ThO_2$ solution can be formed. The poly-basic salts are not used because their multi-valent anions adversely affect stability of the sol during formation. Thorium nitrate, thorium chloride and thorium perchlorate are suitable for this purpose. For preparation by electrolytic methods, the chloride would, a priori, appear to be desirable. However, chlorides are corrosive at elevated temperatures and extreme care must be exercised to insure complete removal. For this reason, if the clad sol is to be used for a reactor blanket, it is normally preferred to use thorium nitrate as a starting salt. Trace nitrate impurities which might remain in the sol are not as harmful as chlorides would be.

Thoria sols prepared by any of the foregoing techniques are characterized by relatively dense, generally spherical particles having colloidal dimensions and exhibiting no tendency to agglomerate at ambient temperatures. However, on heating, the particles do commence to accrete with the result that they are not sufficiently stable to hydro-thermal treatment to permit their use in the nuclear reactors. The present invention provides a method whereby these thoria sols can be rendered satisfactorily stable.

Thoria dispersions have been prepared by peptizing thorium oxide hydrogels. Such dispersions have been characterized by undesirably high viscosities and they are not rendered hydrothermally stable by any heretofore known method. These undesirable characteristics arise from the irregular shapes of the particles making up the dispersion as well as their high degree of hydration.

CLADDING SOL

We have discovered that the generally spherical, colloidal densified thoria particles prepared as described above can, in accordance with the present invention, be clad with a protective layer of silica and then stabilized by maintaining a prescribed alkalinity, by use of alkali hydroxides. However, certain hereinafter defined precautions must be taken to avoid gelation of the thoria during the cladding treatment.

We have also discovered that the parent thoria sols as well as the cladding silica sols should be relatively dilute to insure proper and rapid mixing. For example, it is preferred to use a parent thoria sol at a solids content of about 10%. In like manner, it is preferred to use a cladding silica sol at a concentration of about 1–2% silica.

In order that accretion of the silica particles to the thoria particles occur rapidly and completely, it is necessary that the silica particles be in an "active" state, as is characteristic of freshly prepared sols. In addition, the cladding silica sol should be relatively free of large micelles since they are inactive. On the other hand, sols which have been stabilized as by heat treating or aging do not accrete to the thoria particles and are not suitable for the present purposes. Accordingly it can be said that the silica sol should be active or freshly prepared and that it should have been prepared under conditions which would yield a micelle size of less than 5 millimicrons. Useful sols of silica may be prepared by deionizing sodium silicate by passing it through a cation exchange resin. Ion exchange is the preferred method since it yields a sol substantially free of electrolytes. This method is described fully in U.S. Patent No. 2,244,325. It is preferable that both the thoria and silica sols be substantially free of electrolytes at the time they are brought together. Otherwise gelation may occur. A silica sol prepared by ion exchange contains virtually no sodium (about 0.002%) and is very reactive. Sols of about 2% silica (preferred at this stage) can readily be prepared by ion exchange.

CLADDING TREATMENT

Electrophoresis tests reveal that the thoria particles in the parent sol carry a positive charge, whereas silica particles carry a negative charge. This measurement is made in accordance with the method described in "Physical Methods or Organic Chemistry," Part II, 2nd edition, by A. Weissberger, page 1685. The apparatus comprises a Tiselius cell and a Schlieren optical system.

Mixing thoria and silica sols in amounts sufficient only to neutralize the charges on the respective particles may result in gelation or precipitation at the isoelectric point. We have discovered that this precipitation or gelation does not occur if the mixing is carried out under such conditions that the charge on the thoria particles is changed quickly from positive to negative and the mixture is not allowed to stand for any appreciable time at the isolectric point. Thus, it is necessary that the silica sol be added to the parent thoria sol rapidly and with thorough mixing so that the particles or micelles of thoria and silica are brought to the negative side substantially instantaneously.

In this way, gelation can be avoided. In order to insure complete and rapid mixing of the silica and thoria particles, the sols should be relatively dilute when mixed. Once the thoria has been coated with silica particles and the coated aggregates exhibit a negative charge, the danger of gelation is not so great. This mixed sol exhibits some of the properties of silica sols and, since both starting sols were acid, the mixed sol is also acid. Like silica sols it is not stable for long periods at acid pH and may be gelled by the addition of electrolytes or by heating to concentrate. We have found that the mixed sol can be stabilized by the addition of sufficient alkali metal hydroxide to raise the pH of the solution to a value of between 7.0 and 11.0, the preferred pH being about 7.5–9.0. This should be done soon after mixing. At about pH 11, the silica begins to be redissolved. Therefore, it is desirable to add just enough alkali to insure stability of the final sol but not enough to dissolve the silica.

The amount of silica used in cladding the thoria particles must be sufficient to convert the charge on the thoria particles from positive to negative. The weight ratio of thoria to silica cannot be stated with mathematical exactness since the amount of silica required to coat a thoria particle is dependent on the amount of surface and not on the weight of the thoria. Obviously if the thoria is relatively dense the weight ratio of silica to thoria will be lower than if the thoria particles are lighter. In general, the thoria-to-silica weight ratio will be in the range of about 1:1 to 10:1 and preferably between 2:1 to 3:1.

Since neutron capture is a nuclear process depending on atomic concentration and since silicon is a relatively light element (at wt. of 28 as compared with 232 for thorium) the thoria-to-silica ratio should be as high as possible. However, even at weight ratios as low as 1:1, the presence of silicon does not reduce the efficiency too much because its thermal neutron capture cross section (measure of neutron capturing ability) is 0.13 barn as compared with 7.0 barns for thorium. Thus at a thoria to silica weight ratio of 1:1 (atomic ratio of 0.227 to 1), the silica will capture only about 8% of the neutrons and the thorium will capture 92%; at a 3:1 ratio, the silica will capture only about 2.7%.

The anion content of the sol at this stage is usually in the range of 0.10–1.0 weight percent. Where the anion content of the mixed sol is undesirably high, further purification is normally carried out. This can best be done by heating the alkaline sol under non-evaporative conditions i.e. under total reflux or in an autoclave to insure release of anions from within the micelles. This solution can then be cooled and contacted with a deionizer to remove the electrolytes. If the alkali metal ions are removed, the alkalinity must be restored by adding more alkali metal hydroxide. The resulting pH should be about 7.0–11.0, as stated above. Except for stabilizing alkali metal cations, the resulting solution is substantially electrolyte free.

During heating of the thoria sol as described above, the silica particles become more closely associated with the thoria micelles. No evidence of free silica particles is seen in electron micrographs of autoclaved sols, but the micelles appear as large, dense cores (thoria) having a less dense shell (silica). The sol at this stage is stable indefinitely at temperatures up to 300° C. These sols are well suited for nuclear reactor use discussed above.

CONCENTRATION

A sol prepared as described can be concentrated by evaporation to a solids content of up to 60%. At the normally employed ratios of thoria to silica, the thoria content of the concentrated sol will be about 40–45% and the silica content below about 15–20%, depending on the thoria to silica ratio. It is preferred to add fresh sol continuously during evaporation to avoid deposition of solid material on the sides of the vessel. The finished sol may be diluted to any lower solids content by the addition of de-ionized water or water of low ionic content.

Since sols of this type tend to coagulate or gel on the addition of electrolytes, care must be taken that the electrolyte content be maintained at a minimum. A convenient method of measuring concentration of the undesired ionic materials is conductivity. For the sols of the present invention, conductivity will usually range between $10^{-5}$–$10^{-2}$ mho/cm. The stability of any given sol is improved by a reduction in the ionic content. Therefore, conductivities in the lower part of this range are preferred.

Our preferred hydrothermally stable sols have a specific conductivity of less than that of a pure alkali metal hydroxide solution of the same alkali concentration. Conductivity is measured at 25° C. and one kilocycle using a standard conductivity bridge with a cell inserted in one arm. The cell constant is determined using KCl solutions of 0.01 and 0.02 normality (the conductivity of which is ascertained from conductivity tables) and using the equation:

$$K = L_{KCl} R$$

where:
$K=$ is the cell constant in cm.$^{-1}$
$R=$bridge resistance in ohms
$L=$conductivity in mho/cm.$^{-1}$ of the standard KCl solution The conductivity L of the sol in question is determined by measuring its resistance in the same cell and using the equation:

$$L \text{ sol} = \frac{K}{R}$$

where:
$K=$cell constant
$R=$resistance in ohms

The effectiveness of a thoria sol for neutron capture in a reactor increases with an increase in the concentration of thoria in the blanket. It is desirable that the micelles have a relatively high density while maintaining desired stability in order to allow highest concentrations. Densification of the thoria particles is obtained during the formation of the parent sol or to some extent, by subsequent treatment. For instance, autoclaving will densify the particles to some extent and some densification occurs during use as a blanket material because of the high temperatures prevailing in the reactor. Maximum concentration of thoria which may be obtained in a sol is primarily dependent on its pH, particle size distribution, particle density, and thoria-to-silica ratio. At a given pH, weight percent concentration and ratio of thoria-to-silica the sol of the largest particle size will have the lowest viscosity. Since thoria is more dense than silica, the higher the thoria-to-silica ratio, the higher will be the weight percent solid matter at the same viscosity. In general, sols of good stability have low viscosities.

To facilitate use of the stable sols of the present invention in a nuclear reactor system, a low viscosity is desirable, a relative viscosity below about 3 at 45% solids being preferred.

Sedimentation constants were determined by the method described in Weissberger's "Physical Methods in Organic Chemistry," second edition, Part 1, page 690 et seq. The mathematical relations between the radii of the colloidal particles and their density can be determined from the sedimentation constants and Stokes law for centrifugal fields, using the following equation:

$$S = \frac{2(\rho_P - \rho_O) r^2}{9 \eta}$$

where:
$S=$sedimentation constant
$\rho_P=$density of the particle
$r=$radius of the particle
$\rho_o=$density of medium
$\eta=$viscosity of the medium (water in this case)

This relationship and a radius determined by an independent method, e.g. particle distribution count from an electron micrograph, can be used to estimate particle density.

Our calculations place the particle density of our clad, stable thoria sols in the range of 3–5 g./cc. The density of amorphous thoria is 9.6–10.0 g./cc. This indicates that the amount of water in the micelle is only a fraction of that in the completely hydrated thoria, Th(OH)$_4$.

The thorium content of our sols was determined by fluorescent X-ray spectroscopy using the techniques described in ASTM Special Technical Publication No. 157.

Electron micrographs were made by conventional techniques.

In the present disclosure, we have referred to the use of alkali metal hydroxides and specifically sodium hydroxide, although other bases may be used. However, the selected base should be composed of low thermal neutron cross-section elements and be stable under reactor conditions.

In referring to our dispersions of thoria in water, we mean to include heavy water as well as natural water.

The present invention will be further explained by the following illustrative, but non-limiting examples.

Example 1

4000 gms. of a solution of thorium nitrate in deionized water containing 10% by weight equivalent ThO$_2$ were charged into a heated densification vessel for use in preparing a thoria sol. This solution was circulated at a rate of approximately 150 cc./min. through the cathode compartment of a cell divided by an ion exchange membrane of Amberplex A–1. The electrode compartments each had a capacity of approximately 350 cc. and each was equipped with a stirrer. Platinum electrodes were positioned on each side of the membrane a distance of about ⅛ inch from the membrane.

The temperature in the densification vessel was maintained at about 92–97° C. Thorium nitrate solution was withdrawn from this vessel at a rate of about 150 cc./min. through a cooled heat exchanger and pumped into the above described cell. Temperature of the incoming solution was controlled to maintain a cell temperature of about 25–32° C. The solution leaving the cell was passed through a heat exchanger where it was heated to 92–97° C. and then returned to the densification vessel. Evaporation losses were minimized by equipping the cell with a condenser and by periodically adding deionized water to take care of unavoided losses.

Circulation of the solution was continued over a total period of 29 hours and 10 minutes with over-night interruptions during which periods, the temperature was maintained at 70° C. During electrolysis, the amperage dropped from about 10 to a value of about 1.5 and the pH rose from a value of about 2.0 to about 6.7.

This sol had a density of 1.074 g./cc. viscosity of 1.00, conductivity of 9.63×10$^{-4}$ mho/cm. and contained 8.05 weight percent ThO$_2$. The drop in ThO$_2$ concentration for the finished sol over the initial solution was brought about by the addition of excess water in compensating for evaporation losses.

Electron micrographs, shadowed and unshadowed, revealed spherical, well-defined particles having a weight median diameter of 55 millimicrons. Electrophoresis studies revealed that the sol was positively charged. Sedimentation studies with the ultracentrifuge gave 3 sedimentation constants at 20° C.: 1.65×10$^{-9}$, 0.38×10$^{-9}$, and 0.21×10$^{-9}$ seconds. Using the sedimentation constants, Stokes Equation for centrifugal fields, and the electron micrograph distribution count data, the micelle density was estimateed to be 7±1 g./cc.

For simplicity in the present disclosure, thoria sols at this stage are referred to as "parent sols," after addition of the silica was "daughter sols" and after autoclaving as "grand-daughter sols."

Several liters of silica sol were prepared by passing a nominal 2% SiO$_2$ sodium silicate solution through an acid-regenerated ion exchange resin. The final sol contained 1.99% SiO$_2$, no soda, and had a pH of 3.30. Two liters of this freshly prepared silica sol were mixed rapidly and with vigorous agitation into two liters of the thoria sol described above, which had been further deionized by passing it through an anion exchange resin. After this, an additional two liters of the silica sol were added somewhat more slowly to yield a final sol having a pH of about 3.5. 412 ccs. of 1.0 N sodium hydroxide were added to bring the pH of the mixed sol to 10.0 and the entire system was refluxed at 100° C. for 24 hours, at which time the pH was 9.95. The refluxed sol was then passed through a mixed cation-anion-deionizing resin, which gave a product sol having a pH of 3.66. 50 ccs. of 1.0 N sodium hydroxide were added to the mixed sols to raise the pH to 8.0. The dilute sol was used to prepare by evaporation of water three samples of concentrated sols containing 38.4%, 41.4%, and 46.7% solids.

These sols were then autoclaved at 250° C. for various periods of time in order to determine their hydrothermal stability. Results of these tests together with some of the physical characteristics of the sols are given in Table I.

TABLE I

| Designation | S25 | S30 | S31 |
|---|---|---|---|
| Percent Solids | 38.4 | 41.4 | 46.7 |
| Percent ThO$_2$ (by X-ray Spectroscopy) | 26.2 | 26.4 | 31.7 |
| Density at 25° C. (g./ml.) | 1.445 | 1.494 | 1,583 |
| pH | 8.98 | 8.98 | 8.99 |
| Viscosity prior to autoclaving | 1.71 | 1.76 | 2.08 |
| Viscosity after autoclaving 18 hrs. at 250° C. | 1.10 | | |
| Specific conductivity (mhos/cm. × 10$^4$) | 8.83 | 9.62 | |
| Hydrothermal Stability at 250° C., Stable for at least | 673 hours | 608 hours [1] | 593 hours |

[1] Sol S30 was tested at 300° C. and found to be stable for at least 63 hours.

*Example II*

To demonstrate the effect of size of the thoria particles on stability, three cladded sols were prepared from three parent thoria sols of different particle size. These parent sols were prepared by electrodialyzing thorium nitrate solutions of nominally 5 and 10 percent thoria at predetermined elevated temperatures—higher temperatures being used to give larger particle sizes.

The sols were clad by mixing with the relatively dilute thoria sols a predetermined quantity of a freshly prepared (by ion exchange) silica sol at a concentration of about 2% silica. The silica sol in dilute form had a pH of 3.0 while the thoria sols had pH's of 6.5, 6.7, and 4.4.

In each case, the pH of the mixed sol was adjusted to 10.0 by adding sufficient 1 N NaOH, after which the sols were boiled, deionized, adjusted to pH 8 with 1 N NaOH and concentrated.

The stability of these sols was tested by autoclaving them at 250° C. for 63 hours at the end of which time they were cooled and visually examined for evidence of gelation. The one indicated to be questionable as to stability showed evidence of gelation. The one characterized as "stable" contained a few small lumps, which were redispersed by mild agitation. The one characterized as "very stable" exhibited no evidence of gelation and had a viscosity of 1.21. The following table shows for each thoria sol, the particle size, composition and stability. The two "stable" sols were heated further for more than 200 hours with no signs of instability.

TABLE II

| Parent Weight Median Diameter, millimicrons | Percent Solids ±0.5% | Percent ThO$_2$ ±1% | ThO$_2$ to SiO$_2$ Wt. Ratio | Stability |
|---|---|---|---|---|
| 50 | 29 | 30 | 2.2/1 | Questionable. |
| 55 | 47 | 32 | 2.1/1 | Stable. |
| 77 | 45 | 31 | 2.2/1 | Very Stable. |

On the basis of these tests, it is seen that, within the colloidal size range, the weight median diameter should be above 50 mu to insure the desired thermal stability in the concentrated sol. The particle sizes were determined by direct measurement from electron micrographs of known magnification.

*Example III*

The poor hydrothermal stability of untreated thoria sols is demonstrated by the following example.

A thoria sol, of the parent type, containing 30.2% ThO$_2$, having a pH of 4.88 and a relative viscosity of 1.12 was heated overnight in a Vycor tube. At some time during the 19 hour heating period the sol lost its fluidity and turned into a hydrogel. Direct observation of the tube was made the following morning. No viscosity measurements were made since the sample would not flow.

Another thoria sol sample, also of the parent type, but containing only 6.47% ThO$_2$ was heated overnight at 250° C. in a Vycor tube. After 21 hours the autoclave was opened and the sample examined. The solids in the sample had, at some point during the treatment, separated and had settled to the bottom of the tube. The supernatant liquid showed no turbidity.

*Example IV*

The poor stability of thoria sols of the parent type in the presence of certain ions is demonstrated by the following example.

To portions of deionized thoria sol containing 4.62% ThO$_2$ the following solutions were gradually added:

(a) Dilute NaOH
(b) Dilute NH$_4$OH
(c) Dilute H$_2$SO$_4$
(d) Dilute H$_3$PO$_4$
(e) Tap water (ph 8.0)
(f) Dilute HCl
(g) Dilute HNO$_3$ In cases (a)–(e) the addition resulted in precipitation of hydrous thoria. Addition of HSl and HNO$_3$ did not produce any noticeable change in stability.

*Example V*

The deposition of silica on the thoria micelles in the cladding operation is evidenced by the following data obtained on the parent thoria sol of Example I and on the resulting silica-clad (daughter) sample also of Example I.

(A) The parent thoria sol was studied by electrophoretic techniques which showed that the micelles carried a positive electrical charge.

A similar study of the daughter sample showed that the micelles carried a negative electrical charge.

(B) The parent sample after treatment with silica sol was, in contrast with the behavoir of the untreated parent sol, stable even at pH's as high as 10

(C) The particle size of the daughter sample as pictured in electron micrographs, was definitely larger than that of the parent thoria sol sample. The following table gives the results of the counts made at stated particle diameters.

TABLE V

| Dia. of particles D millimicrons | Wt. percent of parent particles of sol less than D | Wt. percent daughter particles of sol less than D |
|---|---|---|
| 21.5 | 4.5 | 2.8 |
| 31.0 | 14.8 | 6.9 |
| 40.5 | 29.6 | 15.2 |
| 50.0 | 37.9 | 26.9 |
| 55.0 | 50.0 | |
| 59.6 | 56.2 | 33.6 |
| 66.0 | 84.6 | 38.2 |
| 69.2 | 90.3 | 44.8 |
| 75.5 | 100 | 57.8 |
| 78.7 | 100 | 75.2 |
| 81.9 | 100 | 87.0 |
| 85.0 | 100 | 96.0 |
| 94.6 | 100 | 97.4 |
| 97.8 | 100 | 99.9 |

*Example VI*

The increase in size of the particles as a result of the silica sol treatment is indicative of silica build-up on the original thoria micelles. This face was verified by studying the daughter samples with the aid of the electron microscope using techniques directed towards contrasting areas of different electron opacity. The micrographs obtained clearly showed spherical particles, each consisting of a very opaque spherical core surrounded by a less opaque layer or halo.

Ultra centrifuge experiments with the daughter sample yielded three sedimentation constants: $1.67 \times 10^{-9}$, $.43 \times 10^{-9}$ and $.30 \times 10^{-9}$ sec. Using the sedimentation constants, Stokes Equation for centrifugal fields and the electron micrograph distribution count data, micelle densities of the daughter sol was estimated to be $4.5 \pm .8$ gm./cc. This compares with a density of $7 \pm 1$ gms./cc. for the thoria particles.

The amorphous character of the thoria in both the parent and daughter samples was demonstrated by drying portions of each under vacuum at ambient temperature and using the residues obtained for X-ray diffraction studies. In no case was crystallinity observed.

Upon hydrothermally treating the silica-clad sample by heating for 18 hours at 250° C. under non-evaporative conditions, several changes were observed in the resulting sol.

(1) The particle size of the micelles increased from a wt. median diameter of 72 millimicrons to a value of 116 millimicrons. This was no doubt due to the accretion of small independent silica particles to the silica clad thoria micelles.

(2) The layer of silica or halo became more clearly defined in contrast electron micrographs.

(3) The amorphous thorea particles became partly crystalline $ThO_2$. This was established by X-ray diffraction studies of the residue obtained by drying under vacuum at ambient temperature the autoclaved silica-clad thoria sol. The X-ray diffraction pattern obtained was that of Thorianite (anhydrous $ThO_2$).

(4) No changes were observed in the sign of the electrical charge carried by the micelles.

*Example VII*

To demonstrate the necessity for rapid mixing of the thoria and silica sols, 40 cc. of 0.96% $SiO_2$ sol prepared by ion exchange were added slowly and with constant stirring to 100 cc. of 4.7% $ThO_2$ sol prepared by electro- dialysis as described in Example I and having a pH of 4.0. The thoria precipitated before all of the silica sol was added and addition of the remainder of the silica sol did not redisperse the thoria.

In a second test using the same quantities and kinds of starting sols, the silica was added rapidly into the thoria sol with agitation. There was no evidence of precipitate formation. The resulting mixed sol was stable on standing and the thoria particles carried a negative electrical charge.

*Example VIII*

A sample of our clad thoria sol was placed in a reactor where it was exposed to a flux of $2.3 \times 10^{13}$ neutrons/cm.$^2$ sec. at a temperature of 200° C. After exposure for 300 hours, the thoria sol exhibited no change in viscosity, indicating stability to neutrons under the conditions obtained in a nuclear reactor.

We claim:

1. A hydrothermally stable silica-clad thoria sol consisting essentially of an alkaline aqueous dispersion of 10% to 60% thoria particles having a surface layer of silica in sufficient amount to impart to said particles a negative charge as measured by the electrophoretic method and containing a sufficient quantity of alkali metal hydroxide to give a solution pH of 7.0–10.0.

2. A hydrothermally stable thoria sol consisting essentially of a homogeneous aqueous dispersion of 10% to 60% thoria particles in association with sufficient hydrated silica particles to impart thereto a negative electrical charge as measured by the electrophoretic method and containing sufficient alkali metal hydroxide to give a solution pH of about 7.0–9.0, said dispersion being otherwise substantially electrolyte-free.

3. An aqueous thoria sol stable at temperatures up to 250° C. consisting essentially of an alkaline homogeneous dispersion in water of 10% to 60% spheroidal, densified thorium oxide particles having a weight median diameter greater than 50 millimicrons and having associated therewith on the surface sufficient silica to give a negative electrical charge as measured by the electrophoretic method to the thoria particles and sufficient alkali metal hydroxide to yield a solution pH above 7.0 but below 11.0.

4. A concentrated hydrothermally stable thoria sol consisting essentially of 10% to 60% of a homogeneous aqueous alkaline dispersion of spheroidal densified thoria particles of a weight median diameter greater than about 50 millimicrons having distended on the surface sufficient hydrous silica to give a negative charge as measured by the electrophoretic method to said particles and sufficient alkali metal hydroxide to give a solution pH of 7.0–9.5, said solution having a thoria to silica weight ratio below 10:1, a viscosity at 45–47% solids of less than 4.0 and a conductivity of less than that of a pure solution of said alkali metal hydroxide of the same normality.

5. A hydrothermally stable thoria sol consisting essentially of an aqueous homogeneous dispersion of 10–60 weight percent thoria particles of generally spheroidal shape and weight median diameter greater than about 50 millimicrons having a coating of unreactive hydrous silica in sufficient amount to impart a negative charge as measured by the electrophoretic method to said particles and containing sufficient sodium hydroxide to give a solution pH of 7.0–9.0 and having a specific conductivity at 25° C. of less than that of a pure sodium hydroxide solution of the same concentration.

6. A silica-clad stable thoria sol consisting essentially of a homogeneous dispersion in water of thoria particles coated with 10–50 weight percent based on the thoria of stable silica and having a negative charge as measured by the electrophoretic method, said sol containing sufficient alkali metal hydroxide to give an alkaline pH below 11.0.

7. The composition of claim 6 wherein the alkali metal hydroxide is sodium hydroxide.

8. The method of preparing a thermally stable silica-clad thoria sol comprising the steps of rapidly mixing an aqueous thoria sol at a concentration below about 10% with an active aqueous silica sol in sufficient quantity to change the electrical charge on the thoria particles as measured by the electrophoretic method from positive to negative, adding sufficient soluble alkali metal hydroxide to give a solution pH of 7.0–11.0, and thereafter concentrating said sol.

9. The method of preparing a thermally stable aqueous silica-clad thoria sol comprising the steps of rapidly mixing an aqueous thoria dispersion at a thoria concentration of 5–10 percent with an active aqueous silica sol to change the electrical charge on the thoria particles as measured by the electrophoretic method from positive to negative, adding thereto sufficient soluble alkali metal hydroxide to give a solution pH of 7.0–11.0 and thereafter concentrating said sol by evaporation.

10. The method of claim 9 wherein the alkali metal hydroxide is sodium hydroxide.

11. The method of making a thermally stable silica-clad thoria sol comprising the steps of removing the anions from an aqueous solution of a salt of thorium and a strong mono-basic acid having a concentration of 1–10% thoria equivalent, thereby forming an aqueous dispersion of spherical thoria particles having a pH of about 4.5–6.0 and a thoria concentration of 1–10%, adding thereto rapidly and with thorough mixing, a dilute solution of substantially electrolyte-free, active silica sol at a concentration of about 1–2% and in an amount to reverse the electrical charge on the thoria particles as measured by the electrophoretic method from positive to negative, adding thereto sufficient alkali metal hydroxide to give a solution pH of about 7.0–11.0, heating the resulting solution at a temperature above about 100° C. under total reflux to inactivate the silica, contacting said solution with a cation-anion exchange resin to remove free ions contained therein, adding sufficient alkali metal hydroxide to adjust the pH to a value of about 7.0–11.0 and concentrating the resulting solution.

12. The method of making a thermally stable silica-clad thoria sol comprising the steps of removing the anions from an aqueous solution of a salt of thorium and a strong mono-basic acid having a concentration of 1–10% thoria equivalent, thereby forming aqueous dispersion of generally spherical thoria particles of weight median diameter greater than 50 millimicrons, adding thereto rapidly and with thorough mixing a 1–2% aqueous solution of active silica particles substantially free of electrolytes to reverse the electrical charge on the thoria particles as measured by the electrophoretic method from positive to negative, adding thereto sufficient alkali metal hydroxide to give a solution pH of about 7.0–11.0 heating the resulting solution at a temperature above about 100° C. under non-evaporative conditions to inactivate the silica particles, contacting the resulting dispersion with a cation-anion-deionizing resin to remove electrolytes contained therein, adding sufficient sodium hydroxide to adjust the pH to a value between about 7.0 and 9.0 and concentrating the resulting solution.

13. The method of claim 12 wherein the alkali metal hydroxide is sodium hydroxide.

14. The method of claim 13 wherein the solution is deionized after silica activation sufficiently to give a final sol having a specific conductivity below that for a pure aqueous solution of the stabilized alkali metal hydroxide of the same concentration.

References Cited in the file of this patent

UNITED STATES PATENTS

| | | |
|---|---|---|
| 1,577,190 | Patrick | Mar. 16, 1926 |
| 2,438,230 | Rzynar | Mar. 23, 1948 |
| 2,577,484 | Rule | Dec. 4, 1951 |
| 2,885,366 | Iler | May 5, 1959 |

FOREIGN PATENTS

| | | |
|---|---|---|
| 379,133 | Great Britain | Aug. 25, 1932 |

UNITED STATES PATENT OFFICE
CERTIFICATE OF CORRECTION

Patent No. 3,097,175              July 9, 1963

Wayne T. Barrett et al.

It is hereby certified that error appears in the above numbered patent requiring correction and that the said Letters Patent should read as corrected below.

Column 7, line 18, for "was" read -- as --; same column 7, in the table, fourth column, line 3 thereof, for "1,583" read -- 1.583 --; column 8, in the table, third column, line 1 thereof, for "30" read -- 20 --; same column, line 65, for "HS1" read -- HCl --; column 9, line 30, for "face" read -- fact --; line 61, for "thorea" read -- thoria --.

Signed and sealed this 14th day of April 1964.

(SEAL)
Attest:
ERNEST W. SWIDER

Attesting Officer

EDWARD J. BRENNER

Commissioner of Patents